United States Patent [19]

Spinder

[11] Patent Number: 4,936,258
[45] Date of Patent: Jun. 26, 1990

[54] CUBICLE SEPARATION

[75] Inventor: Pieter Spinder, Le Harkema, Netherlands

[73] Assignee: Spinder Stalinrichting B.V., Netherlands

[21] Appl. No.: 287,471

[22] Filed: Dec. 19, 1988

[30] Foreign Application Priority Data

Dec. 24, 1987 [NL] Netherlands ............... 8703133

[51] Int. Cl.$^5$ .............................................. A01K 1/00
[52] U.S. Cl. ........................................................ 119/27
[58] Field of Search ............................ 119/27, 14.03

[56] References Cited

U.S. PATENT DOCUMENTS

| 1,079,166 | 11/1913 | Cramer | 119/27 |
| 1,819,335 | 8/1931 | Olson | 119/27 |
| 2,294,781 | 9/1942 | Ingraham | 119/27 |
| 2,642,037 | 6/1953 | Merrill | 119/27 |

FOREIGN PATENT DOCUMENTS

| 57490 | 8/1982 | European Pat. Off. | 119/27 |
| 2936090 | 3/1981 | Fed. Rep. of Germany | 119/27 |
| 3317450 | 11/1984 | Fed. Rep. of Germany | 119/27 |
| 8203681 | 4/1984 | Netherlands | 119/27 |
| 136970 | 8/1952 | Sweden | 119/27 |
| 0605583 | 5/1978 | U.S.S.R. | 119/27 |

Primary Examiner—Paul J. Hirsch
Attorney, Agent, or Firm—Zarley, McKee, Thomte, Voorhees & Sease

[57] ABSTRACT

By laterally connecting the shoulder beam of a cubicle separation to the separation that is bent in mushroom-shape and by bending it towards the head beam that serves as the fulcrum for the complete structure of separation and shoulder beam, an extremely simply constructed tiltable cubicle separation is obtained.

10 Claims, 1 Drawing Sheet

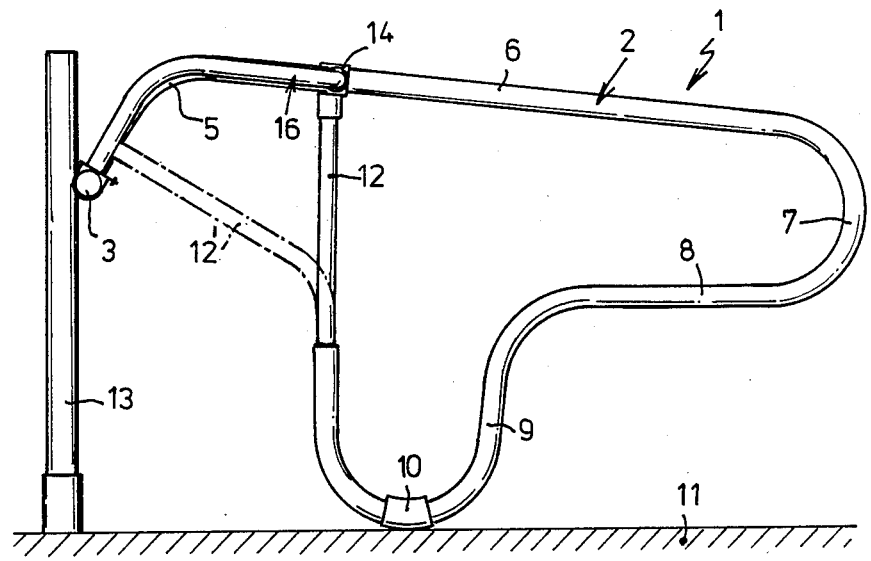
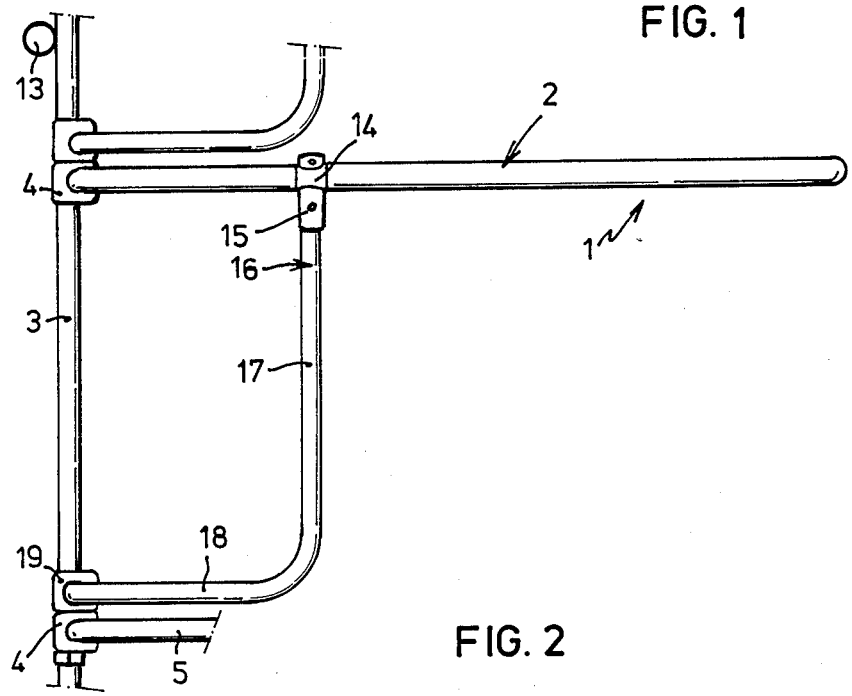

CUBICLE SEPARATION

BACKGROUND OF THE INVENTION

The invention relates to a cubicle separation, substantially comprising a separation of tube material that is bent in mushroom-shape, an upwardly movable shoulder beam and a head beam.

Such a cubicle separation is known from Dutch patent application No. 82 01332. The measures to make the shoulder beam upwardly movable consist in this known cubicle separation in slidable connections between the shoulder beam and the separations disposed on either end thereof. These connections have to compensate the extension of the shoulder beam if this would not remain parallel to itself when moving it upwardly. This arrangement entails extra costs, both with respect to manufacture and with respect to maintenance.

SUMMARY OF THE INVENTION

The invention aims to improve the above-described situation. According to the invention this has been attained, in that the shoulder beam is laterally connected to the separation and bent, both in top view and in side view, towards the head beam that serves as the fulcrum for the complete structure of separation and shoulder.

In a preferred embodiment the connection comprises a three-dimensional clamp to which also a tube portion, extending substantially vertical in its rest position, of the separation is connected.

BRIEF DESCRIPTION OF THE DRAWINGS

The invention will be further elucidated hereafter on the basis of the drawing, showing as an example an embodiment of a cubicle separation according to the invention. In the drawing:

FIG. 1 shows a side view of the invented device and
FIG. 2 shows a top view of FIG. 1.

DETAILED DESCRIPTION OF THE DRAWINGS

The cubicle separation shown in the drawing comprises a separation 1 of tube material that is bent in mushroom-shape, constructed of a long tube 2 that at its one outer end is connected to a sleeve 4 that is rotatable about a head beam 3. The long tube 2 in its position shown in the drawing extends upwardly with an arcuate tube portion 5 and from there rectilinearly downwards in a top portion 6, sloping towards a semi-circularly and downwardly bent end portion 7 that merges into a horizontal bottom portion 8. However, it is also possible that the top portion 6 sloping downwardly in the (drawn) rest position extends substantially horizontally. About halfway its length the long tube 2 of the separation 1 has a portion 9 bent in reversed U-shape. At the lowest point of the portion 9 bent in U-shape a rubber or plastic sleeve 10 is disposed, with which the separation 1 rests on the floor 11. This sleeve serves in the first place as a buffer stop, but it may also serve to protect the tube from corrosion due to the animals' excrements.

In the free end of the portion 9 bent in U-shape a short tube 12 of smaller diameter is welded tightly, which tube connects the end of the long tube 2 to its arcuate tube portion 5.

At the usual distance from the head beam 3, which is supported on the floor 11 by means of poles 13, clamps 14 have been mounted on the top portions 6 of the separations, to which clamps a shoulder beam 16 is connected by means of a bolt 15.

In the preferred embodiment the short tube 12 extends substantially vertical in the rest position of the separation and the clamp 14 is a three-dimensional clamp. However, the short tube may also be deflected, as drawn by the dotted line, to a portion of the tubular tube section 5 that is closer to the head beam 3, and welded thereto. The shoulder beam 16 may then be connected by means of a T-clamp 14 to the top portion 6, but this emododiment appears to be less stable.

The shoulder beam 16 comprises a piece of tube material that is bent in such a manner that a horizontal portion 17 is created that merges into a rearwardly and downwardly bent portion 18 that at its end is connected to a sleeve 19 that is pivotable about the head beam and that is in the vicinity of the sleeve 4 of a next separation. The shoulder beam is at such a distance from the floor 11 that the cattle cannot crawl through under it; for cows this is ±80 cm. The shoulder beam 16 is then ±110 cm above the floor. If a cow should walk against it with its neck, it would lie down. If the animal wants to get up, it can move one of the separations 1 of its cubicle 1 upwards by means of the shoulder beam 16.

Other embodiment than the one shown in the drawing are also within the scope of the claims.

I claim:

1. An improved cubicle separation including a head beam, and a separation privotally connected to the head beam, the improvement comprising:
    a shoulder beam having a substantially horizontal portion with opposite first and second ends, and a bent portion with opposite first and second ends, the horizontal and bent portions being substantially perpendicular to one another;
    the first end of the horizontal portion being connected to the first end of the bent portion;
    the second end of the horizontal portion being fixed to the separation such that the horizontal portion extends substantially perpendicular thereto; and
    the second end of the bent portion being pivotally attached to the head beam.

2. The cubicle separation of claim 1 wherein the horizontal portion and bent portion are integrally formed.

3. The cubicle separation of claim 1 wherein the bent portion extends downwardly from the horizontal portion.

4. An improved cubicle separation including a head beam and a separation pivotally attached to the head beam, the improvement comprising:
    a shoulder beam having one end connected to the separation and an opposite end pivotally connected to the head beam such that an animal can raise the separation by lifting the shoulder beam.

5. The cubicle separation of claim 4 wherein the shoulder beam includes two portions extending substantially at right angles to one another.

6. The cubicle separation of claim 5 wherein the two portions are integrally formed.

7. The cubicle separation of claim 4 wherein the shoulder beam extends rearwardly and upwardly from the head beam.

8. A cubicle separation comprising:
    a head beam; and
    a separation pivotally connected to the head beam for movement between raised and lowered positions, the separation including a leg portion for supporting the separation on a support surface when the separation is in the lowered position.

9. The cubicle separation of claim 8 wherein the leg portion is formed integrally on the separation.

10. The cubicle separation of claim 8 wherein the separation has a reversed C-shaped end portion opposite the head beam and an inverted U-shaped portion extending from the end portion so as to define the leg portion.

* * * * *